United States Patent [19]

Hinton et al.

[11] Patent Number: 4,655,984

[45] Date of Patent: Apr. 7, 1987

[54] METHOD OF AND APPARATUS FOR ISOSTATICALLY PRESSING A BODY FROM PARTICULATE MATERIAL

[75] Inventors: Jonathan W. Hinton, E. Amherst, N.Y.; Donald S. Pratt, Birmingham; Edward J. Gehart, Washington, both of Mich.

[73] Assignee: Champion Spark Plug Company, Toledo, Ohio

[21] Appl. No.: 660,669

[22] Filed: Oct. 15, 1984

[51] Int. Cl.⁴ .................................................. B28B 7/06
[52] U.S. Cl. .................................... 264/314; 264/318; 425/127; 425/405 H; 425/DIG. 44; 445/7
[58] Field of Search ...... 425/405 H, 129 R, DIG. 19, 425/DIG. 44, DIG. 58, 127, 440–442, 405 R, 577; 264/313, 314, 315, 318, 63, DIG. 54; 445/7

[56] References Cited

U.S. PATENT DOCUMENTS

| | | | |
|---|---|---|---|
| 2,152,738 | 4/1939 | Jeffrey | 425/405 H |
| 2,582,922 | 1/1952 | Crowley et al. | 425/405 H |
| 3,034,191 | 5/1962 | Schaefer et al. | 425/405 H |
| 3,313,871 | 4/1967 | Vogel et al. | 425/DIG. 26 |
| 3,502,755 | 3/1970 | Murray | 425/405 H |
| 3,824,051 | 7/1974 | Van Leemput | 425/DIG. 44 |
| 3,897,531 | 7/1975 | Overhoff et al. | 425/405 H |
| 3,998,422 | 12/1976 | Putzer | 425/DIG. 58 |
| 4,097,977 | 4/1978 | Pollner | 425/405 H |
| 4,255,103 | 3/1981 | Rozmus | 425/405 H |
| 4,330,250 | 5/1982 | Pinkas | 425/405 H |

Primary Examiner—Jay H. Woo
Assistant Examiner—J. Fortenberry
Attorney, Agent, or Firm—Oliver E. Todd, Jr.

[57] ABSTRACT

A method of and apparatus for forming a pressed body (54) with a bore (56) therein and with a notch (58) in the exterior surface thereof. The body (54) is formed by isostatically pressing particulate material (52) in an elastic mold (14) so that the material (52) is compacted into a self-supporting mass. Used in conjunction with the elastic mold is a mold closure and core holder member (32) to which is fixed a rigid core (42) and a resilient notch defining bar (44).

8 Claims, 9 Drawing Figures

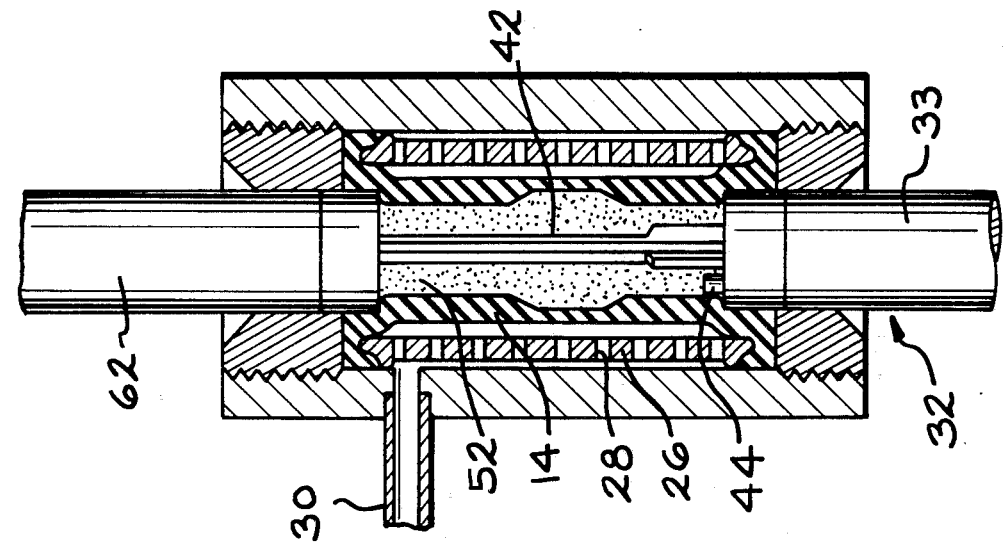
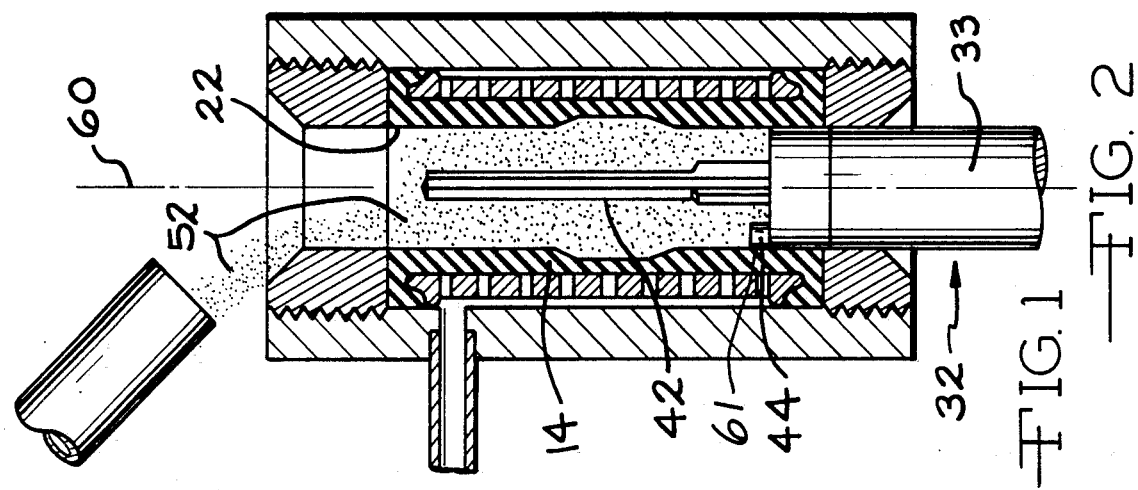
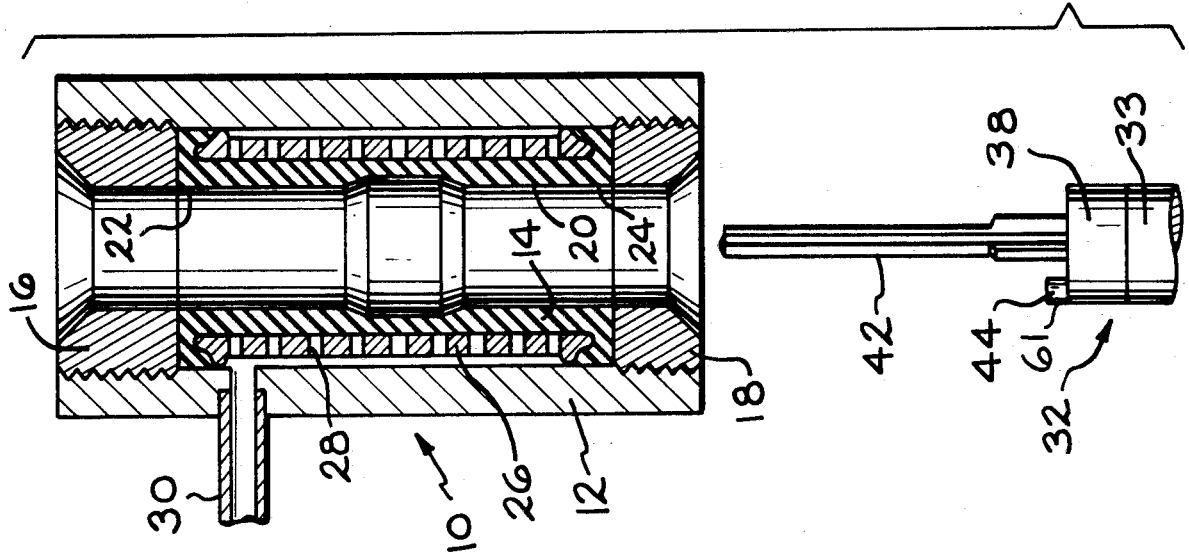

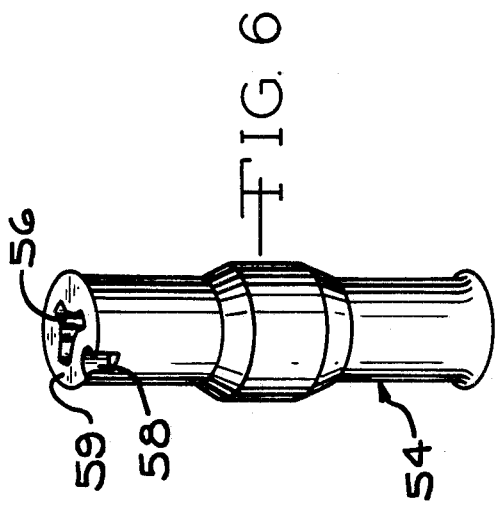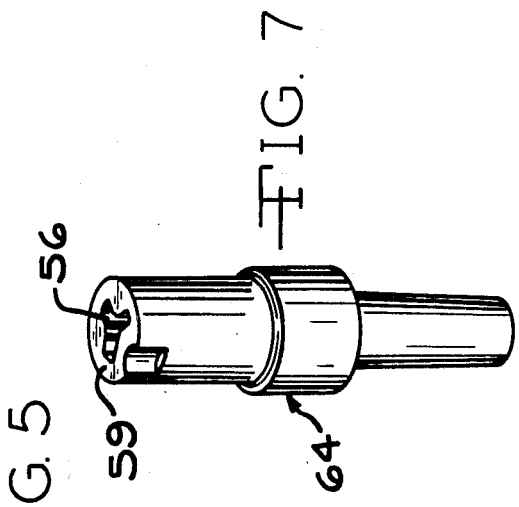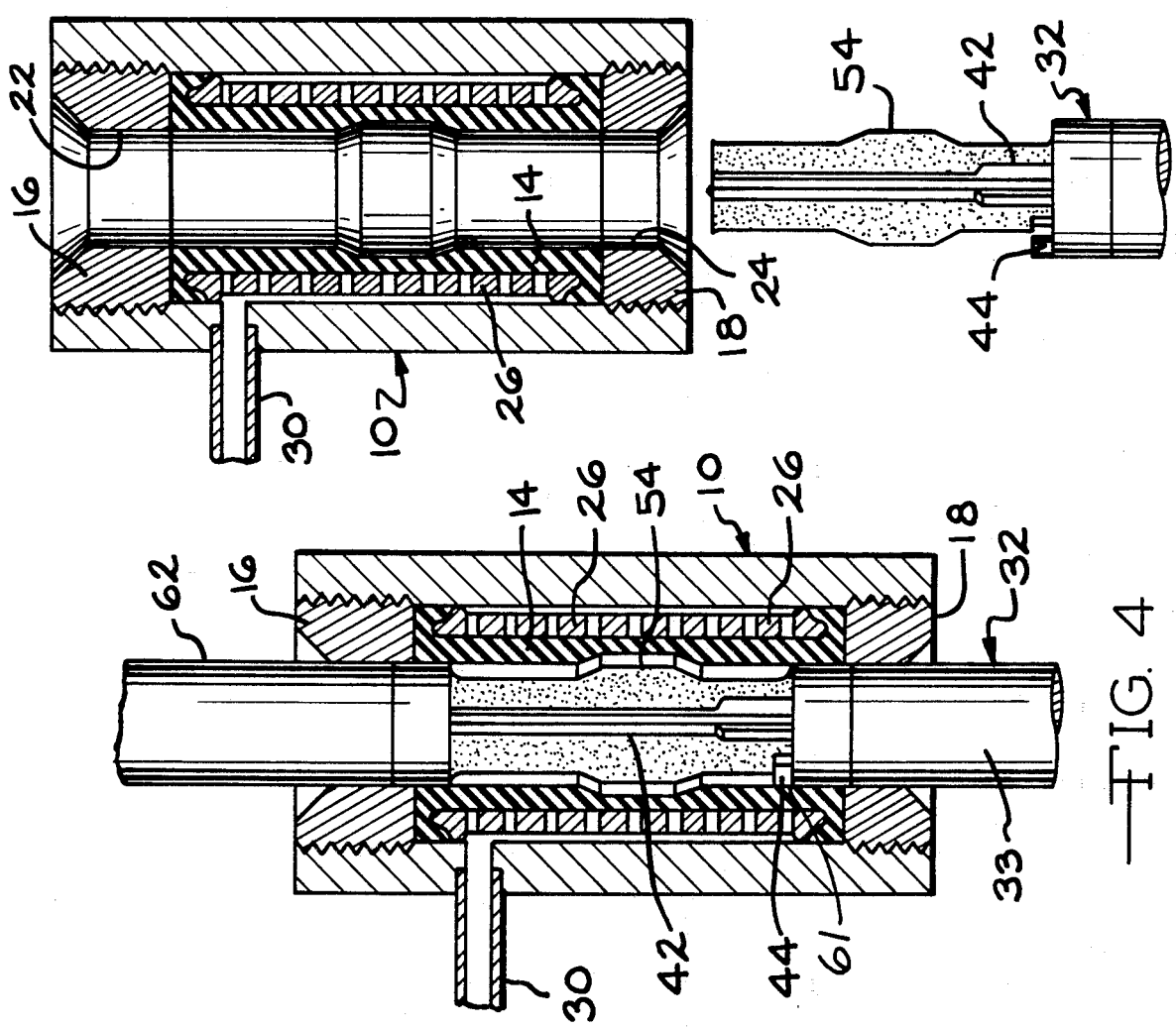

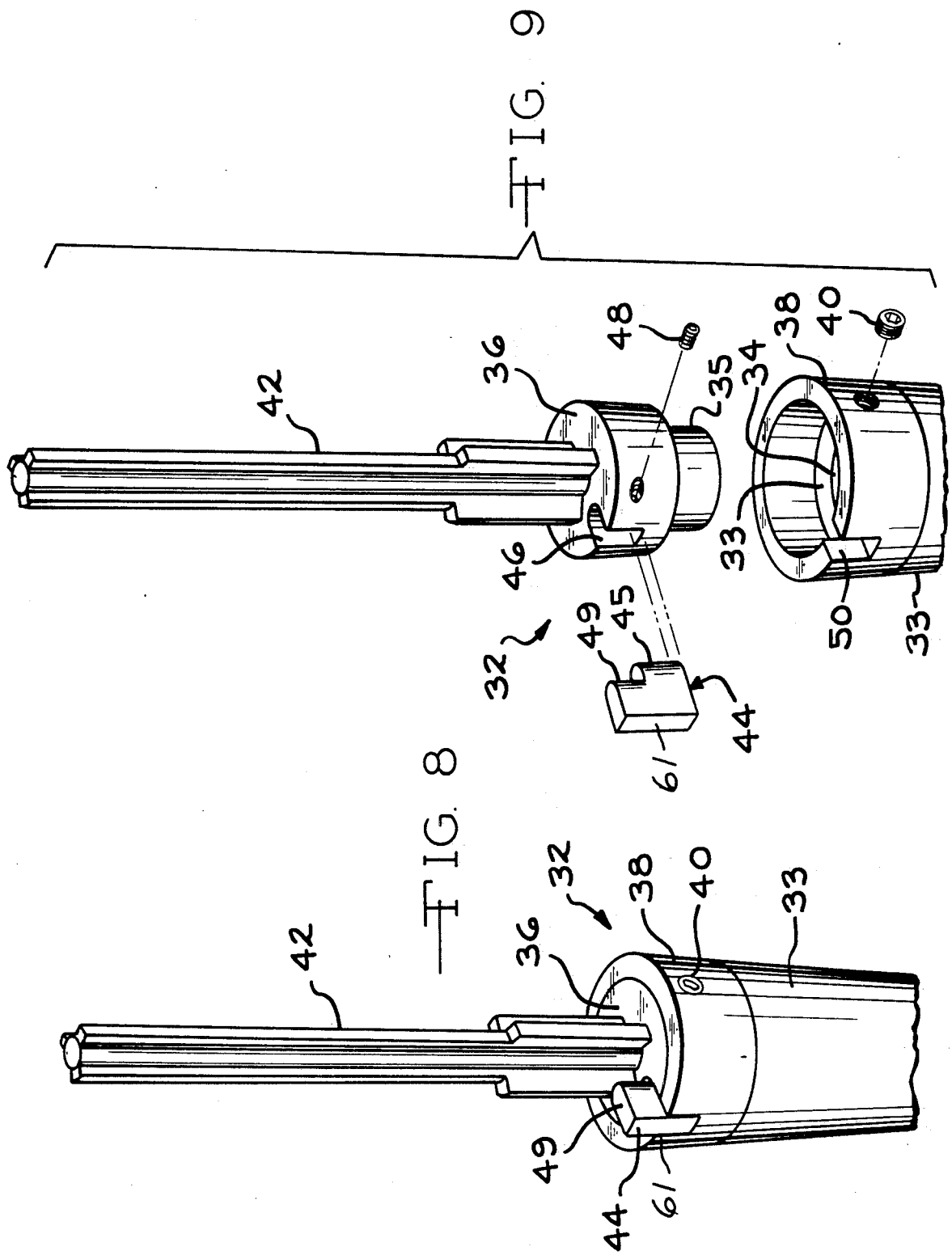

METHOD OF AND APPARATUS FOR ISOSTATICALLY PRESSING A BODY FROM PARTICULATE MATERIAL

BACKGROUND OF THE INVENTION

This invention relates to a method of forming a body by pressing particulate material, and more specifically to a method of forming a body having a bore therein and a notch in the exterior surface thereof by isostatically pressing ceramic batch material.

In manufacturing articles from particulate materials, the raw batch material often is placed in a mold formed from a resilient material, such as an elastomer. After the mold is filled, it is sealed and isostatic pressure is applied to the exterior of the mold to press the batch material into a green body. The green body is removed from the mold, further shaped when necessary, and fired to form a finished article. This process is used for forming ceramic articles such as spark plug insulators and oxygen sensor insulators. The process is known in the prior art as illustrated, for example, in U.S. Pat. Nos. 4,097,977 and 2,152,738.

The prior art process has been suitable for making articles of many shapes. However, problems have occurred when trying to form a notch in the exterior surface of a tubular green body adjacent an end of the body. Such a notch may be desirable as a locator for a multiple terminal connector which attaches to a vehicle exhaust oxygen sensor. In order to form a tubular body, a rigid core must extend through the center of the mold cavity. If a rigid insert is placed in the mold cavity to form the notch in the exterior surface of the body, the particulate material will not pack between the insert and the core and a defective body will be produced. In order to solve this problem, a tubular body was formed without the notch and the notch was machined into the green body prior to firing. However, this process added to the cost of manufacturing the finished article.

BRIEF SUMMARY OF THE INVENTION

This invention relates to a method of and apparatus for forming a pressed tubular body having a notch in the exterior surface thereof. The body is formed by isostatically pressing particulate material in an elastic mold which is closed at one end by a mold closure and core holder member. Fixed to the closure and holder member is a rigid core and a resilient notch defining bar which is disposed adjacent the elastic mold when the closure and holder member is postioned to close the one end of the mold. When the mold cavity is filled and sealed and isostatic pressure is applied, the elastic mold is urged inwardly to compress the particulate material. The mold also urges the bar inwardly towards the core to compress the material between the bar and the core while producing a notch in the exterior surface of the resulting body.

It is a principal object of the invention to provide an improved method of and apparatus for forming a tubular body having a bore and a notch in the exterior surface thereof by isostatically pressing a particulate material in an elastic mold.

The above and other objects, features and advantages of the invention will become apparent upon consideration of the detailed description and appended drawing.

BRIEF DESCRIPTION OF THE DRAWING

FIGS. 1 through 5 show various steps in the method of the invention,

FIG. 6 shows a green body removed from the mold assembly,

FIG. 7 shows a green body of FIG. 6 after it has been turned to finished shape,

FIG. 8 shows an assembly of a mold closure and core holder member, a rigid core and a resilient notch defining bar, and FIG. 9 is an exploded view of the assembly shown in FIG. 8.

DETAILED DESCRIPTION OF THE PREFERRED EMBODIMENT

Referring to the drawing, reference numeral 10 denotes a mold assembly for manufacturing a ceramic insulator for an internal combustion engine exhaust gas oxygen sensor. The mold assembly 10 includes a rigid pressure housing 12 which is generally tubular in shape and a tubular elastic mold 14 disposed in the housing 12 and held between upper and lower guide and mold retainers 16 and 18. The elastic mold 14 includes a mold cavity 20 with upper and lower openings 22 and 24.

Encircling the elastic mold 14 and disposed between the mold 14 and the housing 12 is a fluid manifold 26 which essentially is a sleeve with a plurality of radially extending passages 28. Pressurized fluid such as a hydraulic oil can be supplied to the interior of the housing 12 by a conduit 30, the pressurized fluid being distributed by the manifold 26 so that equal force is applied to the elastic mold 14 at all points to cause the mold 14 to move inwardly.

Used in conjunction with the mold assembly 10 is a mold closure and core holder member 32, best seen in FIGS. 8 and 9. The closure and holder member 32 includes a central shaft 33 with a threaded recess 34 which accepts a threaded end 35 of a base 36. A tubular sleeve 38 surrounds the base 36 and is held in place by a retaining screw 40. Fixed to base 36 is a rigid core 42. Also fixed to base 36 is a resilient notch defining bar 44 which has a lower portion 45 adapted to be disposed in a slot 46 in the base 36 and held in place by a retaining screw 48. It will be noted that the lower portion 45 of the bar 44 extends radially and outwardly into a slot 50 in the sleeve 38. The core 42 may be integral with the base 36 or separable therefrom, as desired. The bar 44 has an upper portion 49 which is spaced further from the core 42 than the lower portion 45 of the bar 44. As a consequence, when the upper bar portion 49 is pushed by the mold 14 towards the core 42, the upper bar portion 49 is free to move uniformly towards the core 42 rather than rotate on tip towards the core 42.

The method of the invention can be used to form from particulate material 52, such as ceramic batch material, a shaped body 54 with a bore 56 and a notch 58 in the exterior surface thereof adjacent an end 59 by isostatically pressing the particulate material 52 into a cohesive self supporting mass.

In carrying out the steps of the invention, the mold assembly 10 is provided as shown in FIG. 1. The lower opening 24 of the elastic mold 14 is closed by the closure and holder member 32 and the cavity 20 then is filled with particulate material 52 through the opening 22, as shown in FIG. 2. At this point it will be noted that the core 42 extends into the cavity 20 substantially along the longtitudinal axis 60 of the elastic mold 14 and the resilient bar 44 is disposed in and has an edge 61 which abuts the elastic mold 14. That is, the bar 44 is in contact with the elastic mold 14 or essentially in contact with it to move inwardly with the mold 14.

Next, the upper opening 22 of the elastic mold 14 is closed by an upper mold closure member 62 and then pressurized fluid, such as hydraulic oil, is supplied through the conduit 30 to the manifold 26 and distributed uniformly around the outer surface of the elastic mold 14 so that mold 14 is caused to move inwardly, as shown in FIG. 3. Inward movement of the elastic mold 14 also causes the bar 44 to move inwardly since it is resilient. The extended lower portion 45 allows the upper portion 49 of the bar 44 to move inwardly while staying substantially parallel to the core 42. As a result the particulate material 52 is compacted into a cohesive self supporting mass defining the body 54. Further, the provision of the resilient bar 44 serves to define the notch 58 in the exterior surface of the body 54 and, since the bar 44 is resilient and moves inwardly with the elastic mold 14, the particulate material 52 disposed between the bar 44 and the core 42 is compacted into a cohesive self supporting mass.

After the partculate material 52 has been pressed or compacted into the desired body, the supply of pressurized fluid to the mold assembly 10 through the conduit 30 is removed and the elastic mold 14 returns to its normal position, pulling away from the body 54, as best be seen in FIG. 4. Thereafter, the upper mold closure member 62 is withdrawn and the lower closure and holder member 32 is withdrawn, thereby removing the body 54 from mold cavity 20. The body 54 then is removed from member 32 to provide a green ceramic insulator with a bore 56 and a notch 58, as shown in FIG. 6. This green body 54 may be turned or machined to a desired shape 64 and dimension as shown in FIG. 7 and then fired to sinter the compacted ceramic batch material.

It is to be understood that the above detailed description of the present invention is intended to dislcose the preferred embodiment thereof to those skilled in the art, but that the invention is not to be construed as limited in its application to the details of construction and arrangements of parts illustrated in the accompaning drawings, since the invention is capable of being practiced and carried out in various ways without departing from the spirit of the invention. The language used in the specification relating to the operation and function of the elements of the invention is employed for purposes of description and not of limitation, and so the limits of our invention should be determined from the following claims when viewed in light of the prior art. The invention has been described for forming insulators or bodies from a ceramic batch material. It will be appreciated that the method is applicable for forming articles from other particulate materials, such as powdered metals which are sintered after pressing in a mold cavity.

We claim:

1. A method of forming a body having an interior bore and a notch in the exterior surface thereof radially spaced from said bore, said body being formed from particulate material by isostatically pressing the particulate material in a mold cavity, comprising the steps of:
   (a) providing an elongated elastic mold with a cavity and first and second openings,
   (b) providing a rigid mold closure and core holder member to which a resilient notch defining bar and a rigid core are attached,
   (c) closing said first mold opening with said closure and holder member so that said bar is adjacent said mold and extends laterally and longitudinally partially along a wall of said mold cavity and said core extends longitudinally into said mold cavity in a radially spaced apart relationship with said bar,
   (d) filling said mold cavity with particulate material,
   (e) closing said second mold opening,
   (f) applying isostatic force to said elastic mold to displace said mold and said bar radially inwardly, thereby compacting said particulate material into a body with a bore therein and with a notch in the exterior surface thereof and having the particulate material between the notch and the bore uniformly compacted with the remainder of the body, and
   (g) removing said body from said mold cavity.

2. A method as set forth in claim 1 and including the steps of:
   (a) machining said body to shape the exterior surface thereof, and
   (b) firing said machined body to sinter said compacted particulate material.

3. A method of forming a green ceramic insulator having an interior bore and a notch in the exterior surface radially spaced from said bore, said insulator being formed by isostatically pressing ceramic batch material in a mold cavity, comprising the steps of:
   (a) providing a tubular elastic mold with a cavity and a rigid end section to which a resilient notch defining bar and a rigid core are fixed so that said bar is adjacent said mold and extends radially and longitudinally into said mold cavity and partially along the circumferance of said mold cavity and said core extends longitudinally into said mold cavity in a radially spaced apart relationship with said bar,
   (b) filling said mold cavity with ceramic batch material,
   (c) closing said mold cavity,
   (d) applying isostatic force to the exterior of said elastic mold to displace said mold and said bar radially inwardly, thereby compacting said ceramic batch material into an insulator with an interior bore and notch in the exterior surface thereof and having the material between the notch and the bore uniformly compacted with the remainder of the insulator, and
   (e) removing said insulator from said mold cavity.

4. The method as set forth in claim 3 and including the step of: turning said insulator to shape the exterior surface thereof.

5. A mold assembly for isostatically pressing particulate material into a body having an interior bore and a notch in the exterior surface thereof radially spaced from said bore, comprising:
   (a) a pressure housing adapted to be connected to a source of pressurized fluid,
   (b) a fluid manifold disposed in said housing,
   (c) an elastic mold disposed in said housing and encircled by said fluid manifold, said mold having a longitudinal axis and including a cavity and at least one opening,
   (d) a removable holder disposed in and closing said opening to define a closed cavity with said mold, (e) a rigid core fixed to said holder and extending substantially along said longitudinal axis into said cavity, and (f) a resilient notch defining bar having a first end fixed to said holder and a second end extending into said cavity, said bar being disposed adjacent to said elastic mold and spaced radially outward and apart from said core.

6. A mold assembly as set forth in claim 5, wherein said first end of said bar extends within said holder closer to said core than said second end of said bar whereby the portion of said bar in said cavity is free to move towards said core while staying substantially parallel to said core.

7. For use with an elastic mold having a cavity with a longitudinal axis and an opening, an assembly comprising:

(a) a holder which can be disposed to close the mold opening, (b) a rigid core fixed to said holder and disposed to extend into the mold cavity substantially along the longitudinal axis of the mold cavity when said holder is disposed to close the opening, and (c) a resilient notch defining bar having a first end fixed to said holder and a second end disposed to extend into the mold cavity adjacent to the mold when said holder is disposed to close the mold, (d) said bar being spaced radially apart from said core.

8. An assembly, as set forth in claim 7, wherein said first bar end extends within said holder closer to said core than said second bar end.

* * * * *